United States Patent
Abrashkevich et al.

(10) Patent No.: US 7,440,933 B2
(45) Date of Patent: Oct. 21, 2008

(54) METHOD FOR FACILITATING PROBLEM RESOLUTION

(75) Inventors: Alexander Abrashkevich, Toronto (CA); Dmitri Abrashkevich, Toronto (CA); John H. Bailey, Durham, NC (US); Sean Chen, Fremont, CA (US); James B. Cottingham, Fuquay-Varina, NC (US); Michael Peter Etgen, Cary, NC (US); Vijaya Ratnala, Austin, TX (US); Frederick O. G. van Veen, Richmond Hill (CA); Michael LaVerne Wamboldt, Garner, NC (US); Mark Francis Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 10/871,143

(22) Filed: Jun. 18, 2004

(65) Prior Publication Data
US 2005/0283451 A1    Dec. 22, 2005

(51) Int. Cl.
*G06F 17/00* (2006.01)
*G06N 5/02* (2006.01)
*G06N 5/00* (2006.01)

(52) U.S. Cl. .......................... 706/46; 706/45
(58) Field of Classification Search .............. 705/4, 705/10–11; 706/45–46
See application file for complete search history.

(56) References Cited

U.S. PATENT DOCUMENTS

| | | | |
|---|---|---|---|
| 5,239,487 A * | 8/1993 | Horejsi et al. ............... 706/916 |
| 5,701,400 A | 12/1997 | Amado ........................ 395/76 |
| 5,875,431 A | 2/1999 | Heckman et al. ............... 705/7 |
| 5,893,083 A | 4/1999 | Eshghi et al. ................. 706/45 |
| 5,933,818 A | 8/1999 | Kasravi et al. ................ 706/12 |
| 6,021,403 A | 2/2000 | Horvitz et al. ................ 706/45 |
| 6,088,689 A | 7/2000 | Kohn et al. ................... 706/10 |
| 6,171,109 B1 | 1/2001 | Ohsuga ...................... 434/118 |
| 6,233,570 B1 | 5/2001 | Horvitz et al. ................ 706/11 |
| 6,260,035 B1 | 7/2001 | Horvitz et al. ................ 706/60 |
| 6,311,175 B1 | 10/2001 | Adriaans et al. .............. 706/25 |
| 6,442,438 B1 | 8/2002 | Naillon ........................ 700/36 |
| 6,446,058 B1 | 9/2002 | Brown ......................... 706/60 |
| 6,473,851 B1 | 10/2002 | Plutowski ...................... 713/1 |
| 6,574,537 B2 * | 6/2003 | Kipersztok et al. ............ 701/29 |
| 6,782,345 B1 * | 8/2004 | Siegel et al. ................. 702/183 |
| 2002/0019870 A1 * | 2/2002 | Chirashnya et al. ......... 709/224 |
| 2002/0029205 A1 | 3/2002 | Pedraza et al. ............... 706/21 |
| 2002/0067360 A1 * | 6/2002 | Chi et al. .................... 345/441 |
| 2002/0194148 A1 | 12/2002 | Billet et al. ................... 706/62 |

(Continued)

OTHER PUBLICATIONS

The American Heritage College Dictionary, Fourth Edition., p. 96. Houghton Mifflin Co. 2004.*

(Continued)

*Primary Examiner*—David Vincent
*Assistant Examiner*—Benjamin Buss
(74) *Attorney, Agent, or Firm*—Sughrue Mion, PLLC

(57) ABSTRACT

Disclosed is a data processing system-implemented method. The data processing system-implemented method includes configuring a symptom pathway that leads to a solution, and associating a usage indicator with the symptom pathway, the usage indicator indicating a frequency in which the symptom pathway was previously implemented for successfully resolving previously experienced problems.

5 Claims, 13 Drawing Sheets

U.S. PATENT DOCUMENTS

| | | | |
|---|---|---|---|
| 2003/0004912 A1 | 1/2003 | Pant et al. | 706/47 |
| 2004/0225381 A1* | 11/2004 | Ritz et al. | 700/26 |
| 2005/0102119 A1* | 5/2005 | Alvarez et al. | 702/183 |

OTHER PUBLICATIONS

Microsoft Computer Dictionary, Fifth Edition. pp. 44-45. Microsoft Press. 2002.*

Vivacqua A., et al, *Agents to Assist in Finding Help*, CHI Letters vol. 2, Issue 1, Apr. 1-6, 2000.

Kusiak, Andrew, *Rough Set Theory: A Data Mining Tool for Semiconductor Manufacturing,* IEEE Transactions on Electronics Packaging Manufacturing, vol. 24 No. 1, Jan. 2001.

Meystel, A., *Early Cognitive Development in Learning Autonomous Control System,* Proceedings IEEE International Symposium on Intelligent Control, Sep 25-26, 1989, pp. 586-588.

Kusiak, A., *Autonomous Diagnostics: A Data Mining Approach,* XI Workshop on Supervising and Diagnostics of Machining Systems, Karpacz, Poland, Mar. 12-17, 2000.

Nishida, T., *Towards Integration of Heterogeneous Knowledge for Highly Autonomous Analysis of Dynamical Systems—Preliminary Report from the PSX Project,* Journal of Information Processing, vol. 15, No. 3, 1992.

Reinhart, G., et al., *Knowledge-Based Information Processing in Manufacturing Cells—the Present and the Future,* Proceedings of the Artifical Intelligence and Symbolic Mathematical Computation, Intl. Conf., AISMC-3 Steyr, Austria, Sep. 23-25, 1996, pp. 109-123.

* cited by examiner

SUB-MENUS 1000 OF GRAPHICAL USER INTERFACE 111

METHOD FOR FACILITATING PROBLEM RESOLUTION

TECHNICAL FIELD OF THE INVENTION

The present invention relates to a data processing system-implemented method, a data processing system and an article of manufacture for facilitating problem resolution.

BACKGROUND

Customer call centers are used by customers that experience malfunctioning equipment or products. The call centers provide technically competent service analysts that help these customers identify their problems and suggest appropriate solutions. The objective of the call center is to resolve problems quickly and correctly so that the customer remains satisfied and continues to remain a loyal user of the product.

The service analysts are troubleshooters. There is an ongoing challenge to ensure that each service analyst is technically competent and remains that way. Lack of knowledge may lead to increased customer response time.

There are many approaches for sharing technical knowledge amongst the service analysts. However, they lack useful tools for addressing efficient methods and systems for ongoing training needed to maintain or improve ongoing customer satisfaction. This is especially important nowadays when new products and services are made available to the public more frequently and in greater numbers.

Accordingly, a solution is desired that addresses, at least in part, these shortcomings.

SUMMARY

The present invention obviates or mitigates at least some of the above mentioned disadvantages.

In an aspect of the present invention there is provided a data processing system-implemented method for directing a data processing system to facilitate problem resolution, the data processing system-implemented method including configuring a symptom pathway that leads to a solution, and associating a usage indicator with the symptom pathway, the usage indicator indicating a frequency in which the symptom pathway was previously implemented for successfully resolving previously experienced problems.

In another aspect of the present invention there is provided a data processing system for facilitating problem resolution, the data processing system including a configuration module for configuring a symptom pathway that leads to a solution, and an associating module for associating a usage indicator with the symptom pathway, the usage indicator indicating a frequency in which the symptom pathway was previously implemented for successfully resolving previously experienced problems.

In yet another aspect of the present invention there is provided an article of manufacture for directing a data processing system to facilitate problem resolution, the article of manufacture including a program usable medium embodying one or more instructions executable by the data processing system, the one or more instructions including instructions for configuring a symptom pathway that leads to a solution, and instructions for associating a usage indicator with the symptom pathway, the usage indicator indicating a frequency in which the symptom pathway was previously implemented for successfully resolving previously experienced problems.

BRIEF DESCRIPTION OF THE DRAWINGS

A better understanding of these and other embodiments of the present invention can be obtained with reference to the following drawings and detailed description of the preferred embodiments, in which.

Similar references are used in different figures to denote similar components.

DETAILED DESCRIPTION OF THE EMBODIMENTS

The detailed description is intended to be understood as being written in a gender neutral form, and the use of "his" or "him" was chosen as a convenient reference.

Figure 1A:
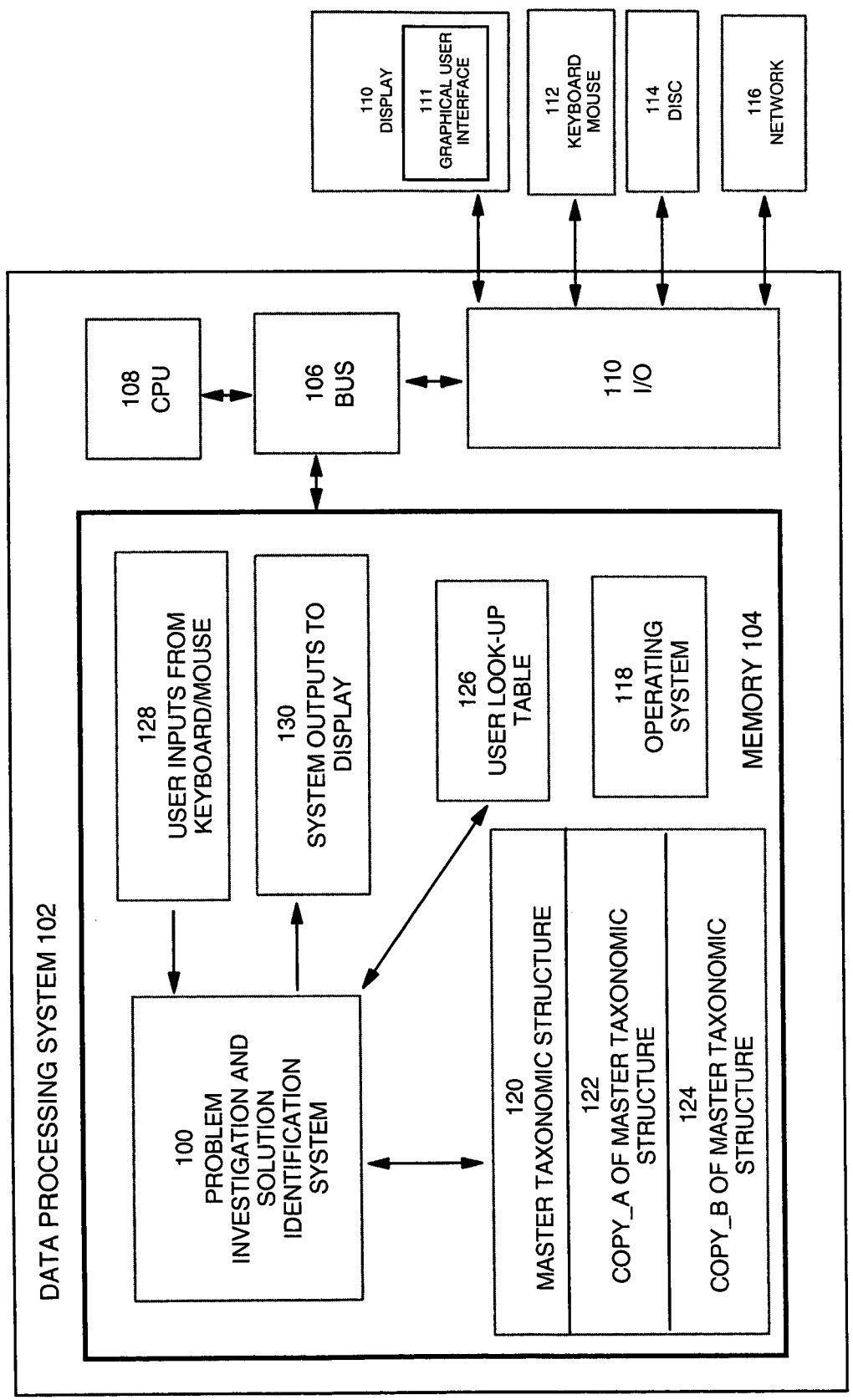
FIGS. 1A and 1B show a data processing system for facilitating problem resolution and a symptom pathway having an associated usage indicator.

FIG. 1A shows a data processing system (DPS) 102 for facilitation of problem resolution. For example, a problem investigation and solution identification system (PIASIS) 100 may be implemented in the DPS 102. The DPS 102 may include a central processing unit (CPU) 108 operatively coupled to a bus 106. The bus 106 may be operatively coupled to memory 104 and an input/output interface 110. The PIASIS 100 may be installed in the memory 104.

The PIASIS 100 includes computer executable code which directs the CPU 108 (in effect, directing the DPS102) to perform functions and operations to be described in detail below. The computer executable code included in the PIASIS 100 may be compiled from high level source code which includes high level computer programming instructions written in a high level computer programming language. For the sake of simplifying the description of the embodiments, the description will refer to the PIASIS 100 as performing specific functions and operations, but in reality it is the PIASIS 100 that directs the CPU 108 (that is, the DPS 102 is being directed) to perform these operations.

The PIASIS 100 may interact with a plurality of symptom pathways. An example of the plurality of symptom pathways is shown as a master taxonomic structure (MTS) 120, a COPY_A 122 of the MTS 120 and a COPY_B 124 of the MTS 120. The COPY_A 122 and the COPY_B 124 are examples of two PMRs (Problem Management Records). The PIASIS 100 also interacts with a user lookup table (ULT) 126. The PIASIS 100 directs the CPU 108 to read user inputs from a keyboard and mouse combination 112 and to write user outputs 130 to a display 110 via the bus 106 and an input/ output interface (I/O) 110. The display 110 shows the user graphical interface 111 by which a user may interact with the PISIS 100.

Memory 104 includes an operating system 118 which performs housekeeping tasks as know to those skilled in the art. The memory 104 is a combination of read only memory components, read and write memory components, short-term and long-term memory components.

Operatively coupled to the I/O 110 are the display 110 which shows a graphical user interface 111, the keyboard and mouse 112 used for inputting commands from a user, a disk 114, and a network 116. The disk 114 tangibly embodies and transports computer executable code used in the PIASIS 100. The disk 114 delivers this computer executable code for storage in the memory 104 via the I/O 110 through the bus 106 and then for storage in memory 104. In an equivalent manner, the computer executable code may be transported and carried by the network 116.

The MTS 120 is assessable for use by all service analysts, in which the MTS 120 shows problem and solution nodes and their interconnecting relationship lines.

COPY_A 122 or COPY_B 124, on the other hand, is copy of the MTS 120 which may be viewed by all service analysts, and those service analysts having a predetermined level of authority may then edit the copy of the MTS 120 as needed. Alternatively, the copy may be hidden from viewing altogether as desired by a service analyst. The service analyst makes a copy of the MTS 120 and then that service analyst may perform his own problem investigation and solution identification task which was assigned to him. COPY_B 124 on the other hand, represents another copy of the MTS 120 but this copy is reserved for another service analyst who is attempting to resolve another customer problem.

The user look-up table 126 may contain names or identification of services analysts, and identifiers that indicate the type of service analyst. For example, types of service analysts may be: administrator, reviewer, author and reader. The hierarchy of the type of service analyst is that the administrator has greater access right to the PIASIS 100 while the reader has the lowest access rights.

The reader status means that this service analyst is new, inexperienced, a manager, or some sort of non-support personnel. The reader status allows this service analyst to confirm and resolve investigation paths taken in the MTS 120 and may promote added weight value to the nodes or relationship lines of the MTS 120 (see FIG. 2 for examples of nodes and relationship lines). The reader status will not allow that service analyst to add any new content to the MTS 120. The reader status may permit this analyst to navigate the MTS 120.

The author status has all the privilege associated with the reader status and in addition, the author status may be responsible for creating the bulk of the content used in the MTS 120. The author status may permit a service analyst to add new nodes, delete and edit their own nodes. The author status may permit the service analyst to confirm and resolve problems during an investigation of a customer problem when that analyst has opened a PMR (which is a copy of the MTS 120). The author status may permit the analyst to promote the information garnered within the copy of the MTS 120 back to the MTS 120 (so that other analyst may begin using that added knowledge in the form of new nodes and relationship lines).

The reviewer status permits the analyst all the privileges of the author status or the reader status. The reviewer status may permit an analyst to assign, add or remove analysts associated with the author status. The reviewer status may permit the analyst to perform aspects of maintenance of the PIASIS 100. The reviewer status may permit the analyst to edit and delete other nodes without prior permission, may permit review of copies of the MTS 120 before the new information contained in the copies (such as COPY_A 122) is uploading to the MTS 120.

The administrator status permits an analyst all the privileges of other types of status. The administrator status permits an analyst to be the main lead or owner for a product that is being serviced. The administrator status permits the analyst to defining high level taxonomy relationships between problem and solution node. The administrator status may permit the analyst to assign, add or remove reviewers.

Service analysts associated with a customer call center may use a taxonomic structure (TS) for facilitating troubleshooting and resolution of a wide variety of customer problems related to products and/or services used by those customers. The customer problems will be referred to as Problem Management Records (PMRs). The TS indicates classification of problems and likely solutions in an ordered sequence of groups interconnected according to their presumed natural relationships.

The TS may be displayed to a service analyst in an intuitive-to-use Graphical User Interface (GUI). The displayed TS may facilitate the exploration of potential solutions to a current customer problem and the evaluation of symptoms and documentation associated with the symptoms. The displayed TS includes visual indicators for how often a previously used solution has been reused successfully. The TS may assist the service analyst in capturing information and experiences used to resolve identified customer problems. The TS may be updated in-situ with new information about new solutions (and any relevant information) used to resolve an existing PMR which turned out to be successful. The TS provides an approach for investigation of problems and selection of corrective actions for those investigated problems. The TS may reduce the troubleshooting effort and improve service expectations.

The TS may also handle cross-product problem determination efforts in which more than one taxonomic structure may be used concurrently for resolving cross product problems (that is, problems that exist due to two or more products being used concurrently).

The TS may be used in an automatic approach for performing most frequent investigations and likely corrective actions; however, when very difficult problems are encountered which cannot be resolved automatically, a human service analyst may intervene. For example, the automatic approach may include autonomic techniques that include the use of self-actuated, self-initiated code which executes autonomously (that is, code that is not initialized or not executed by a human operator).

The displayed TS may indicate weighted paths of investigation and corrective actions which may reduce resolution time and the required level of skill of a service analyst. The displayed TS may be updated with new solutions which may be viewed by other service analysts.

Figure 1B:
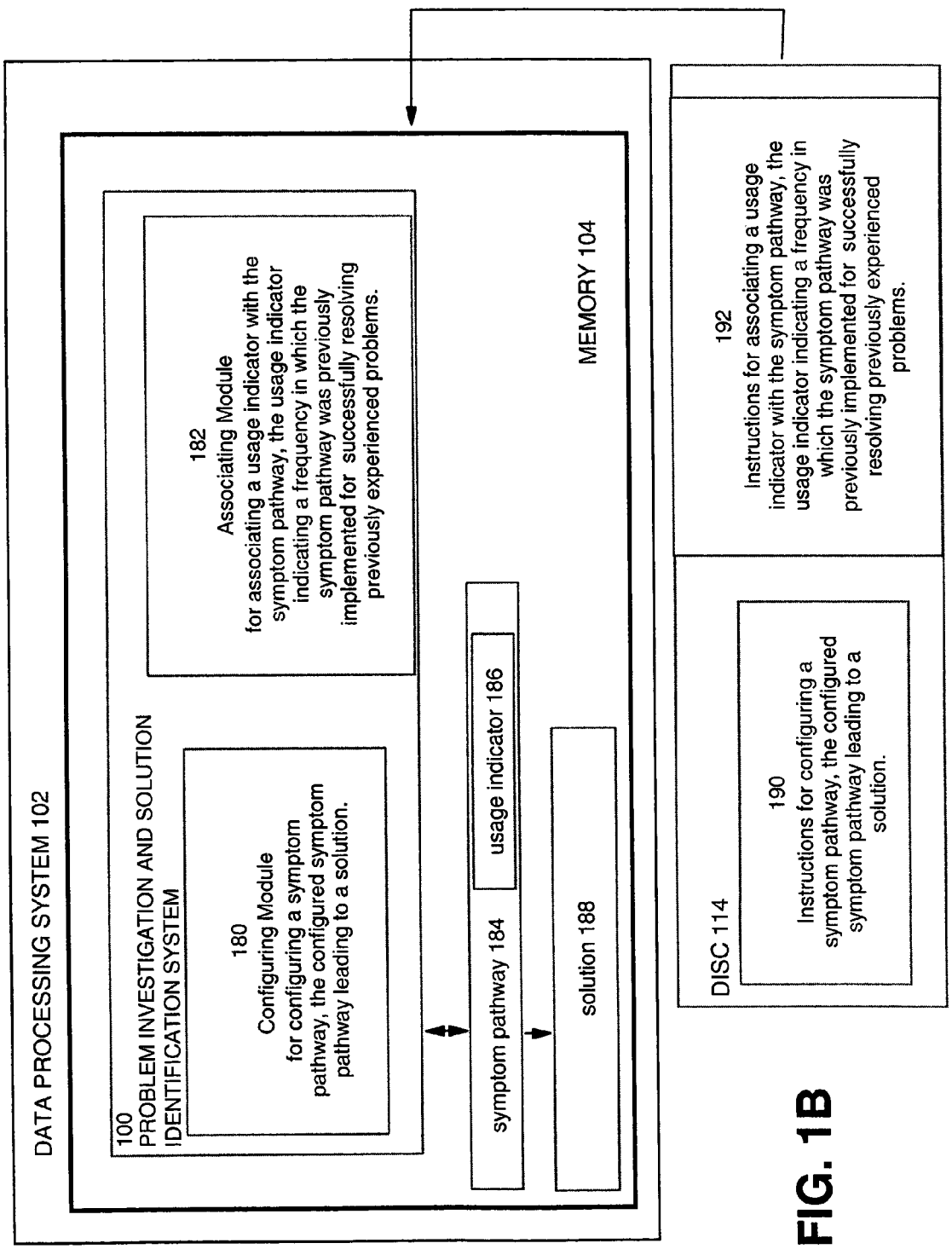

FIG. 1B shows the DPS 102 for facilitating problem resolution. The DPS 102 includes a configuration module (CM) 180 for configuring a symptom pathway (SP) 184, the configured symptom pathway 184 leading to a solution 188. The DPS 102 also includes an associating module (AS) 182 for associating a usage indicator 186 with the symptom pathway 184, the usage indicator 186 indicating a frequency in which the symptom pathway 184 was previously implemented for successfully resolving previously experienced problems. The modules 180 and 182 may be implemented as data processing executable code or instructions which are stored in the memory 104 of the DPS 102.

FIG. 1B also shows an article of manufacture (for example, the disc 114) for directing the DPS 102 to facilitate problem resolution. The article of manufacture includes a program usable medium embodying one or more instructions executable by the DPS 102. The medium may be a signal bearing the instructions (the signal being conveyed by a network) or may be a readable storage floppy disc. The one or more instructions include instructions 190 for configuring a symptom pathway, the configured symptom pathway leading to a solution, and instructions 192 for associating a usage indicator with the symptom pathway, the usage indicator indicating a frequency in which the symptom pathway was previously implemented for successfully resolving previously experienced problems. The instructions 190 and 192 may be stored in the memory 104 and may be included in the PIASIS 100.

Figure 2:
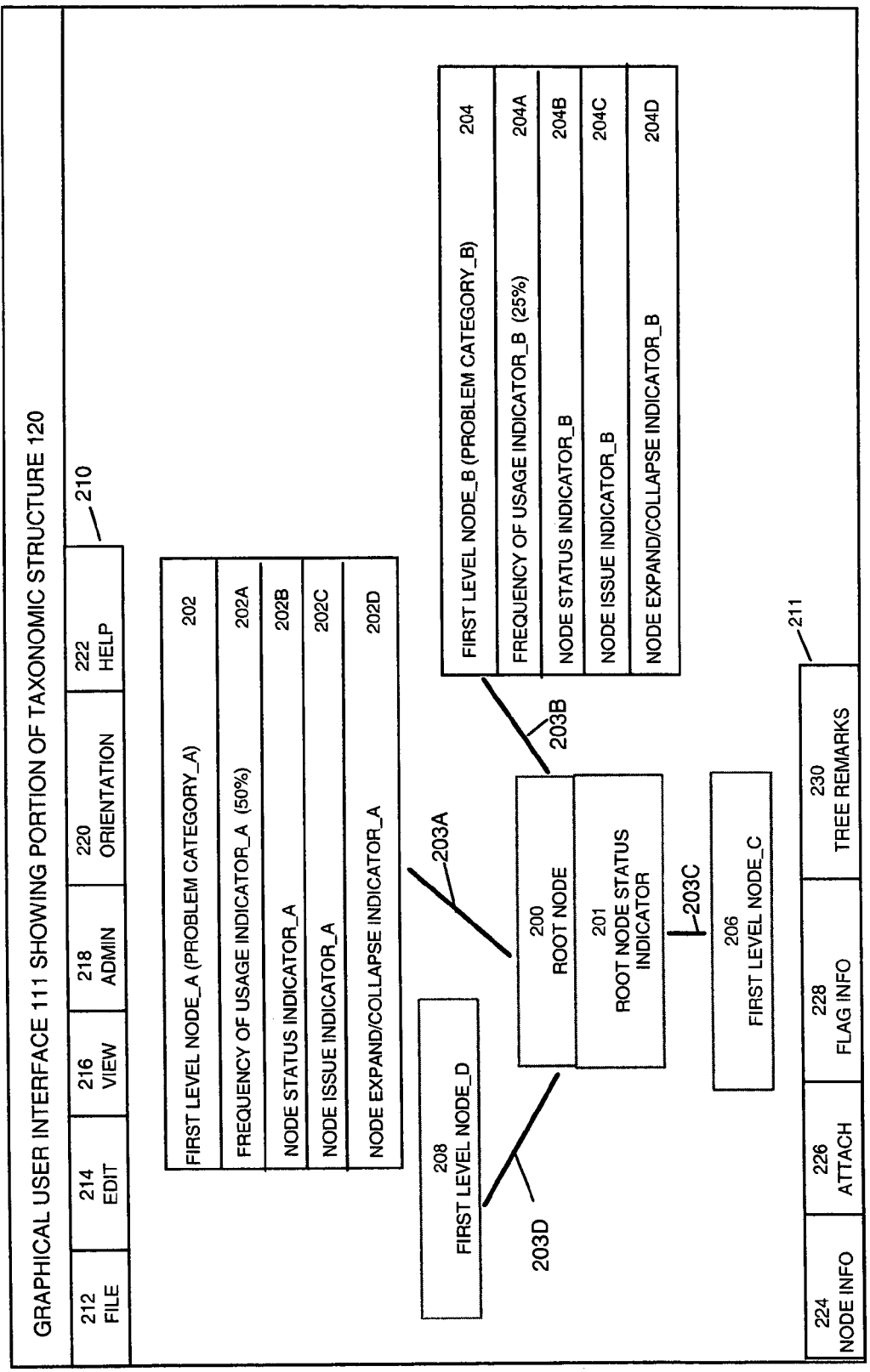
FIG. 2 shows a portion of a MTS (Master Taxonomic Structure) which is an example of a plurality of symptom pathways of FIGS. 1A and 1B.

FIG. 2 shows a portion of the MTS 120 of FIG. 1. The MTS 120 is displayed to a service analyst via graphical user interface 111.

Along the top side of the graphical user interface 111 is a menu bar 210. The menu bar 210 includes menu elements such as: file 212, edit 214, view 216, admin 218, orientation 220, and help 222. At the bottom of the graphical user interface 111 is a lower menu bar 211 which includes submenus: node info 224, attach 226, flag info 228, and MTS remarks 230.

In the centre of the graphical user interface 111 there is displayed a root node 200. The root node merely represents the starting point of the MTS 120. Associated with the root node 200 is a root node status indicator 201.

The MTS 120 is a collection of elements that classify types of problems and types of solutions in an ordered categorical manner so that a natural relationship among the elements may be indicated. The root node 200 may represent, for example, the name of a product currently under investigation by a service analyst. The product may be some item or product or service or combination thereof that is sold and needs to be serviced, such as a lawn mower or a snow blower for example. Typically, the customer is experiencing a problem with the product and then may call a 1-800 number and ask for help from a service analyst.

The MTS 120 displayed in the GUI 111 shows a collection of nodes 202, 204, 206 and 208, and relationship lines or connectors 203A, 203B, 203C and 203D which connect one node to another node. The service analyst uses or refers to the collection of nodes when the service analyst is assigned the task of dealing with the problem identified by the customer. The service analyst is expected to start his problem solving by beginning at the root node 200. The root node status indicator 201 may be displayed so as to identify to the service analyst that this where he must begin his trouble shooting task.

Surrounding the root node 200 are first level nodes: a first level node_A 202, a first level node_B 204, a first level node_C 206, and a first level node_D 208. The relationship between the root node 200 and the first level nodes 202, 204, 206 and 208 is indicated by relationship lines 203A, 203B, 203C, and 203D. Each of these first level nodes 202, 204, 206, 208 indicates a particular problem category that the service analyst may attempt to match up with the sort of problem the customer may be experiencing with the malfunctioning product.

Associated with each first level node are various types of indicators. For example first level node_A 202 is associated with a frequency of usage indicator_A 202A, a node status indicator_A 202B, a node issue indicator_A 202C, and node expand/collapse indicator_A 202D. The frequency of usage indicator 202A may indicate the relative use of node 202 in comparison to other first level nodes. By way of example either a number or some sort of visual linear gauge may be used to indicate the relative frequency of use of node 202 over using 204, 206, 208. As an example, 50% might be shown in the indicator 202A which would mean that 50% of the time—in the past—the service analysts that have dealt with problems pertaining to the root node 200 (that is, a problem related to a product), have found a solution that is related to the first level node A 202 at least 50% of the time. By way of example, the indicator 204 B in the first level node 204 indicates that for 25% of the time, the problems associated with root node 202 maybe found with a solution associated with the first level node 204. The service analyst may act according to these indicators 202A and 204A and decide to investigate the current problem using perhaps the most like problem node which may ultimately lead the service analyst to an existing solution. A problem node may indicate a symptom currently being experienced by the customer.

The node status indicator_A 202B may indicate a current status of the node 202. For example, a color may be used to indicate the node status of the node 202. For example, the color beige may indicate that an existing node requires that no action has been applied to the node 202 (that is, the node 202 is in a neutral state). The color gray may indicate a node which was newly added to the MTS 120 and no action or attribute has been applied this newly added node. The color green may indicate a node which was inserted into the MTS 120 and that node came from another taxonomic structure (such as COPY_A 122). The color dark green may indicate a type of node, such as a solution node. A solution node is a node that contains or displays a solution which the service analyst may attempt to apply to an existing problem. The service analyst arrived at the solution node by navigating the nodes which are interconnected by the relationship lines. A node having a dark green color means that the solution contained in that node has been copied or placed in the MTS 120 which indicates a solution that was confirmed to resolve an existing problem. The color blue may indicate a newly added node that has been confirmed but currently not available for other services analysts to view in the MTS 120. The color dark blue may indicate that the solution node was promoted to as the most likely solution associated with a particular problem node. The color red may indicate an eliminated node or existing nodes from the MTS 120 or nodes which were newly added to a draft or copy of the MTS 120.

Alternatively, the displayed MTS 120 may be configured so that the indicators 202A, 202B, 202C, 202D may be associated with the relationship line 203A instead of being related to the node 202. Also, another variation may be that the indictors 202A and 202B may be associated with node 202 while the indicators 202C and 202D may be associated with the relationship line 203A. It will be appreciated that there are many combinations and permutations for assigning the indicators to the nodes and relationships lines.

Figure 3:
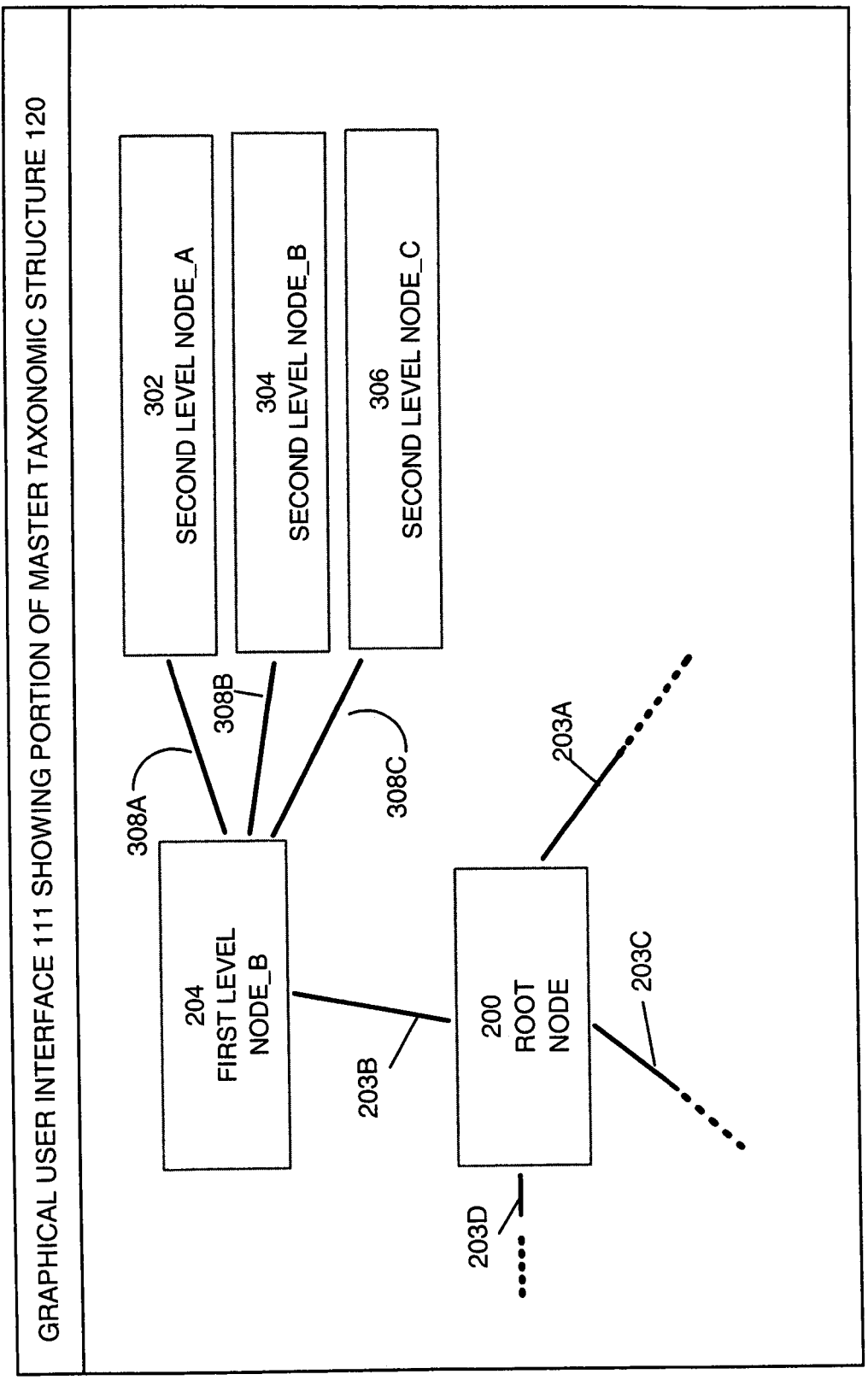
FIG. 3 shows another portion of the master MTS of FIG. 2.

FIG. 3 shows a graphical user interface 111 showing a portion of the master MTS 120 of FIG. 1. This portion shows other nodes 302, 304, 306 that are related to the first level node_B 204. A second level node_A 302, second level node_B 304 and second level node_C 306 identify other problems that may be related to the problem associated with the first level node_B 204. The relationships between the second level nodes 302, 304, 306 and the first level node_A 204 are indicated by relationship lines 308A, 308B and 308C. The description will provide an example of the contents that may be used in these second level nodes. Although the indicators of FIG. 2 are not shown in FIG. 3, the indicators may be used in connection with the nodes 302, 304, 306 and relationship lines 308A, 308B and 308C. It is possible to leave out all of the indicators altogether or to use some of the indicators in combination with the relationship lines and the nodes.

Figure 4:
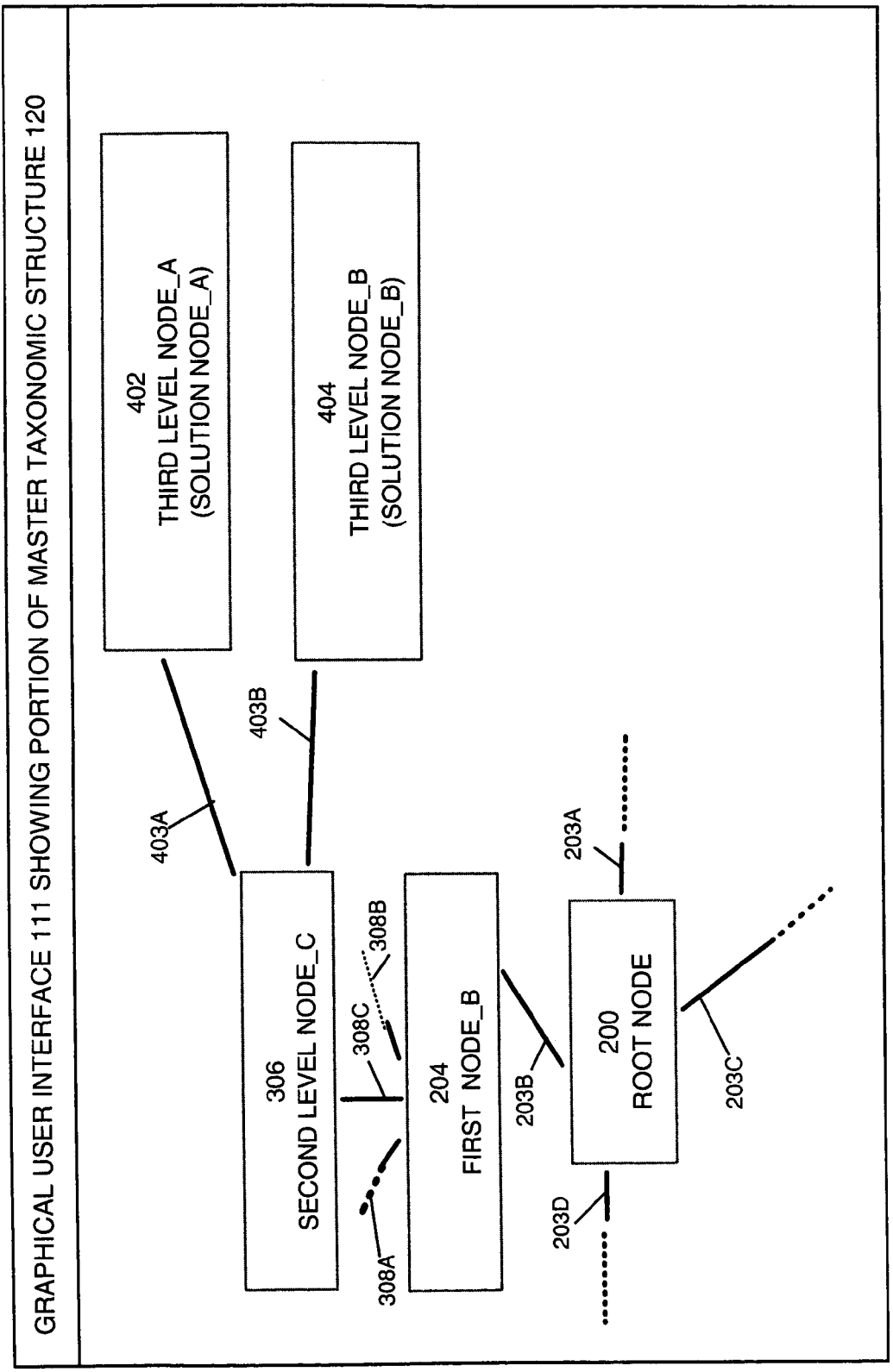
FIG. 4 shows yet another portion of the MTS of FIG. 2.

FIG. 4 shows the graphical user interface 111 showing another portion of the MTS 120 of FIG. 1. This portion shows a possible taxonomic structure for third level nodes and how these nodes may be related to second level nodes. A third level node_A 402 and third level node_B 404 both represent solution nodes, and they represent solutions that may be used to resolve the problem indicated in node 306. Solution nodes 402 and 404 are logically related to second level node_C 306. Relationship line 403A indicates a logical connection between the solution node 402 and the second level node_C 306. Relationship line 403B indicates a logical connection between the solution node 404 and the second level node_C 306.

When a service analyst suspects that a potential solution may be related to the second level node_C 306, they may navigate from the root node 200 via the relationship line 203B and the first level node_B 204, and then the analyst may see that node 204 is related to second level node_C 306 via relationship line 308C. As the service analyst navigates through the MTS 120, he may find himself navigating from the root node 200 to problem node 204 to problem node 306 and then see that associated with the problem node 306 are the solution nodes 402 and 404. Then, the analyst may deduce that out of one of these solutions nodes there is a frequency of use indicator status (not depicted) which is associated with the solution node 402, and this indicator may suggest or imply to the analyst that a potential solution that is indicated or provided by the solution node 402 has been more frequently applied in the past in comparison to the solution indicated in the solution node 404. The service analyst may attempt to try solving the customer's problem by suggesting the potential solution represented in the solution node 402. Failing that potential solution (the customer indicates that the suggested potential solution did not work), the service analyst may attempt suggesting to the customer to use the potential solution represented in the solution node 404.

Later on there will be described a manner in which if a potential solution is not indicated in either of these nodes, the service analyst may have the option of inserting another third level node (a new solution node) to be associated with node 306.

Figure 5:
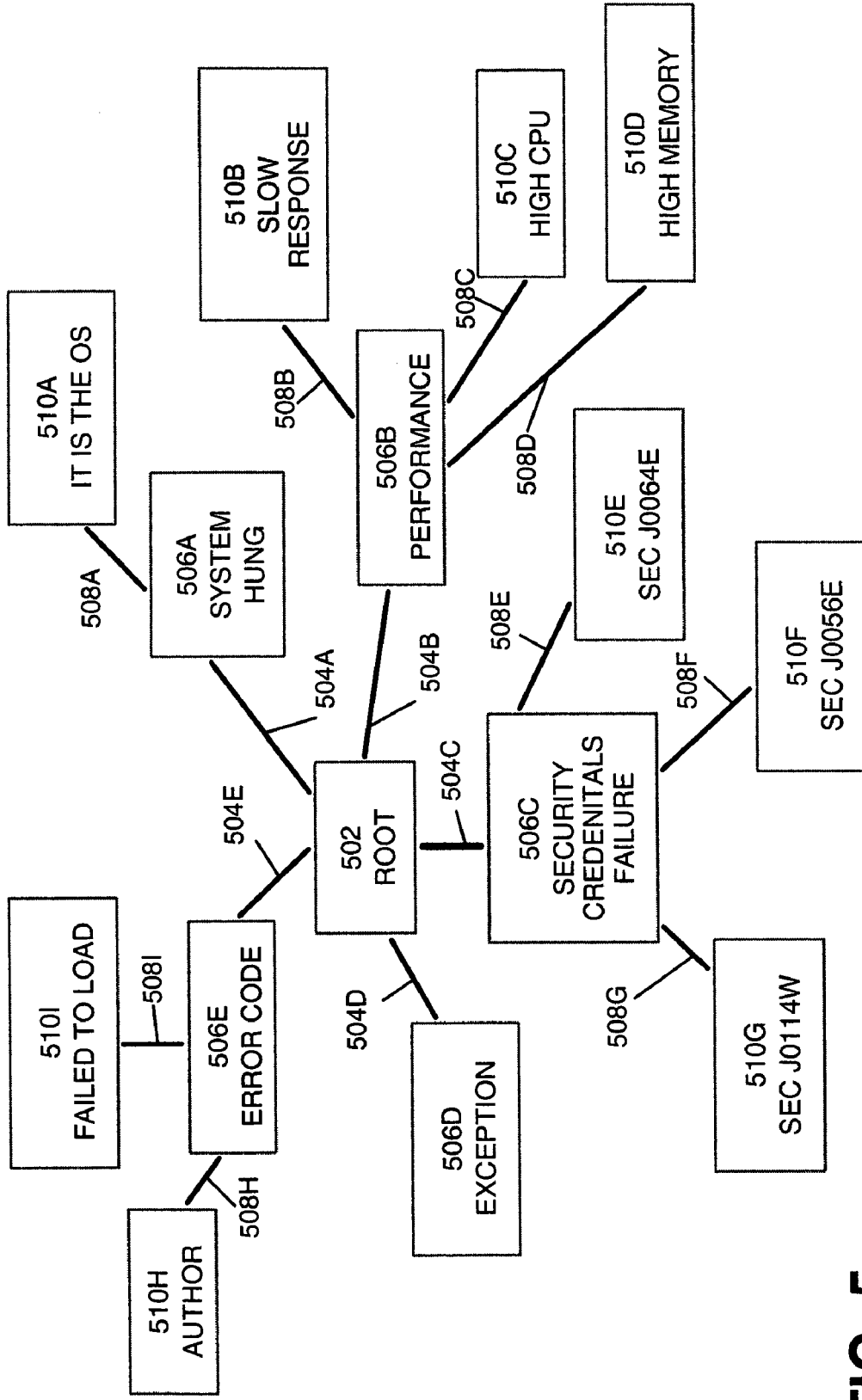
FIG. 5 shows another example of an MTS showing the symptom pathway of FIGS. 1A and 1B.

FIG. 5 shows the graphic user interface 111 showing an example of the MTS 120 of FIG. 1. This example taxonomic structure begins with a root node 502 and from there the taxonomic structure expands outwardly in a radial manner from the root node 502. Related to the root node 502 are first level nodes 506A, 506B, 506C, 506D and 506E. These first level nodes are shown logically related to the root node 502 by relationship lines 504A, 504B, 504C, 504D and 504E respectively. When the service analyst begins examining a problem identified by a customer for a product, the analyst may begin by examining the indicators associated with the first level nodes, such as the frequency of usage indicators. The problem may be related to any sort of product, such as for example a malfunctioning snow blower or e a memory leak problem associated with a computer. When the service analyst begins troubleshooting the current problem, these frequency of usage indicators may indicate that a problem node 506A is the most likely problem that is being experienced by the customer, then followed by less likely problems as shown in problem node 506B, 506C 506D and 506E. The problem node 506E is the least likely problem that the customer may be experiencing at this time. The service analyst may begin by investigating the problem node 506A and then might ask the customer if the customer's problem may be a system that has hung. The customer might reply that this is not indeed the problem. In response to that feedback, the service analyst be prompted (because of these frequency of usage indicators associated with these first level nodes) to begin investigating a potential solution that be associated with problem node 506B because this problem node is the second most likely problem node that may resolve a customer's problem (as indicated by the frequency of usage indicator associated with the problem node 506B). The service analyst then may ask the customer "might your problem be related to a performance problem associated with the product"? The customer might reply that this is not presenting a problem for him at this time. The service analyst may then continue on with investigating problem node 506C, 506D and until finally the analyst may perhaps get to the last problem node 506E. Now the analyst asks the customer "have you noticed any sort of error code that's come up on your display?" (for example). The customer might reply, "Yes in fact, that happens to be my existing problem right now". The service analyst might tune into this reply and then begin investigating the other nodes associated with the first level node 506E, and so on until the analyst reaches an existing solution node or may insert a solution node to the taxonomic structure indicated in FIG. 5. Second level nodes associated with 506E are nodes 510I, 510H (which may be either solution nodes or problem nodes). Again the service analyst then begins another round of questioning and interrogation of the customer to further clarify the nature of the current problem. The analyst continues investigating other potential nodes that may be connected with these second level nodes in which these second level nodes may lead the service analyst on to other n-th level nodes further down or further away from the second level node. There would be other inter-relationship lines that associated the n-th node back through to the nodes down to the root node 502. Other indicators may be used to mark each node or relationship line that the analyst is investigating, in which these indicators show or highlight the analyst's investigation path.

Also shown in FIG. 5 are third level nodes, such as third level nodes 510A, 510B, 510C, 510D, 510E, 510F, 510G, 510H and 510I.

Figure 6:
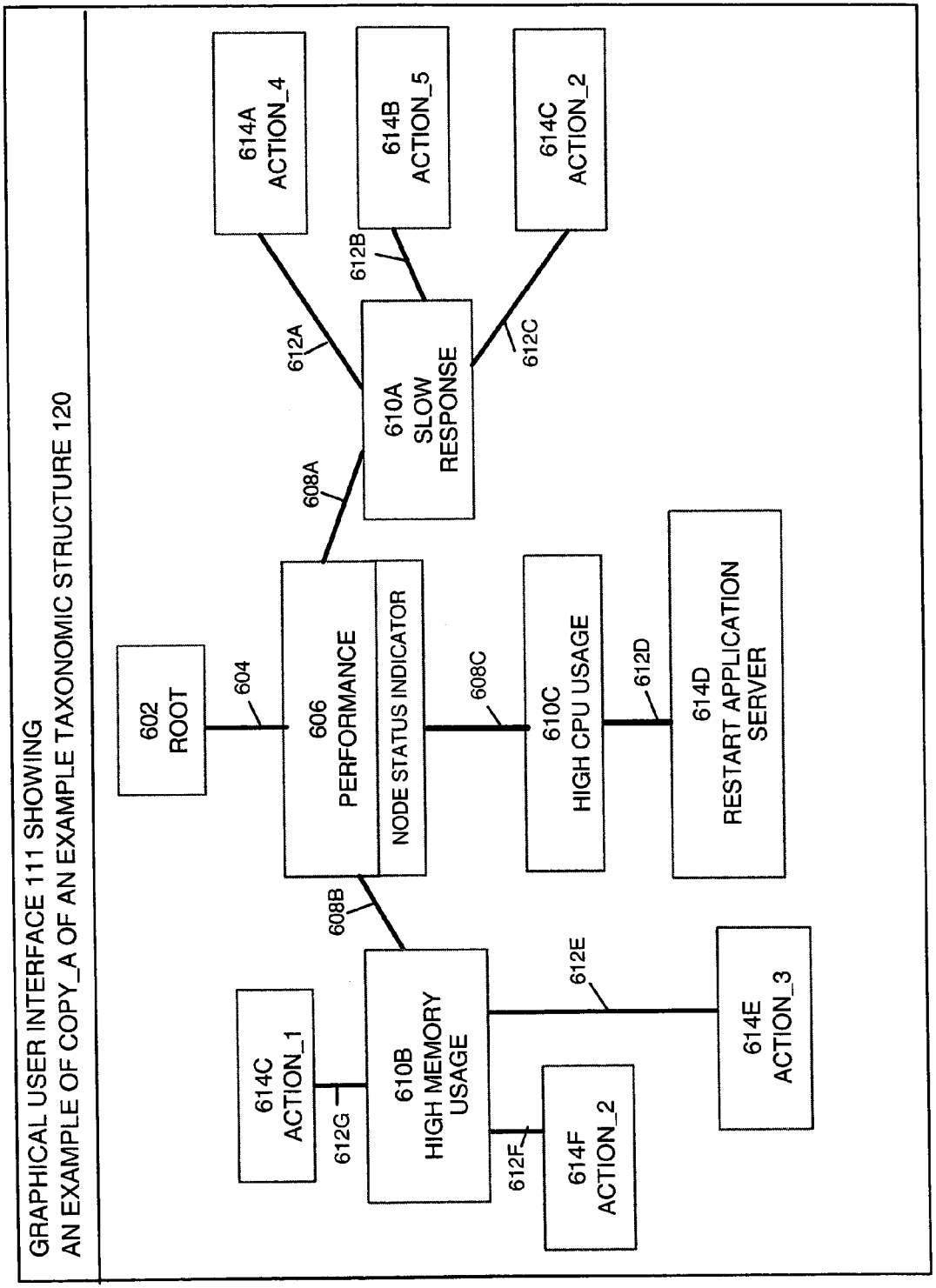
FIG. 6 shows a portion of the example copy of the MTS of FIG. 5.

FIG. 6 shows a graphical user interface 111 showing a portion of the example copy of the MTS 120 of FIG. 5. A service analyst perhaps has now decided that he wishes to make a copy of the master taxonomic structure 120 for his personal use while he attempts to resolve a particular problem that a customer is currently experiencing. The service analyst has begun his troubleshooting task by beginning at the root node 602 (which is a copy of the root node 502) to a second level node 606 because the analyst suspects that the problem has a potential solution which may be associated with problem node 606. The analyst examines and determines which third level node (610A, 610B, 610C) might be the node that may lead the service analyst to a likely solution.

The service analyst might decide to investigate the node 610A because its frequency of usage indicator, in the case, indicates that node 610A is the most likely of the third level nodes 610A, 610B, and 610C that may lead the service analyst to the likely solution. The service analyst, upon asking a few questions to the customer, may realize that the problem is not related to a "slow response" and the service analyst might then begin investigating the problem node 610C because the node 610C is the second most likely node to investigate while the node 610B is the least likely of the three nodes 610A, 610B and 610C that may lead to potential resolution of the current problem.

The service analyst has decided that that the problem node 610C is worth investigating in more depth because the customer has indicated the problem being experienced results in "high CPU usage". In effect the problem nodes may indicate symptoms of the problem. The service analyst may not wish to have such a cluttered graphical user interface 111 and may desire to collapse the problem nodes 610B and 610A so as to simply (de-clutter) the display screen and simplify the amount of information that the service analyst has to deal with.

The service analyst then looks and the other node or nodes related to the problem node 610C and realizes that there is a potential solution presented in node 614D which is to restart the application server. The service analyst may then suggest this potential solution to the customer. The customer then attempts this solution and perhaps the problem is solved. But as we shall see in FIG. 7, the customer may also call back and state that his problem is indeed not solved as of yet, and the service analyst must now deal with this ongoing service call.

Figure 7:
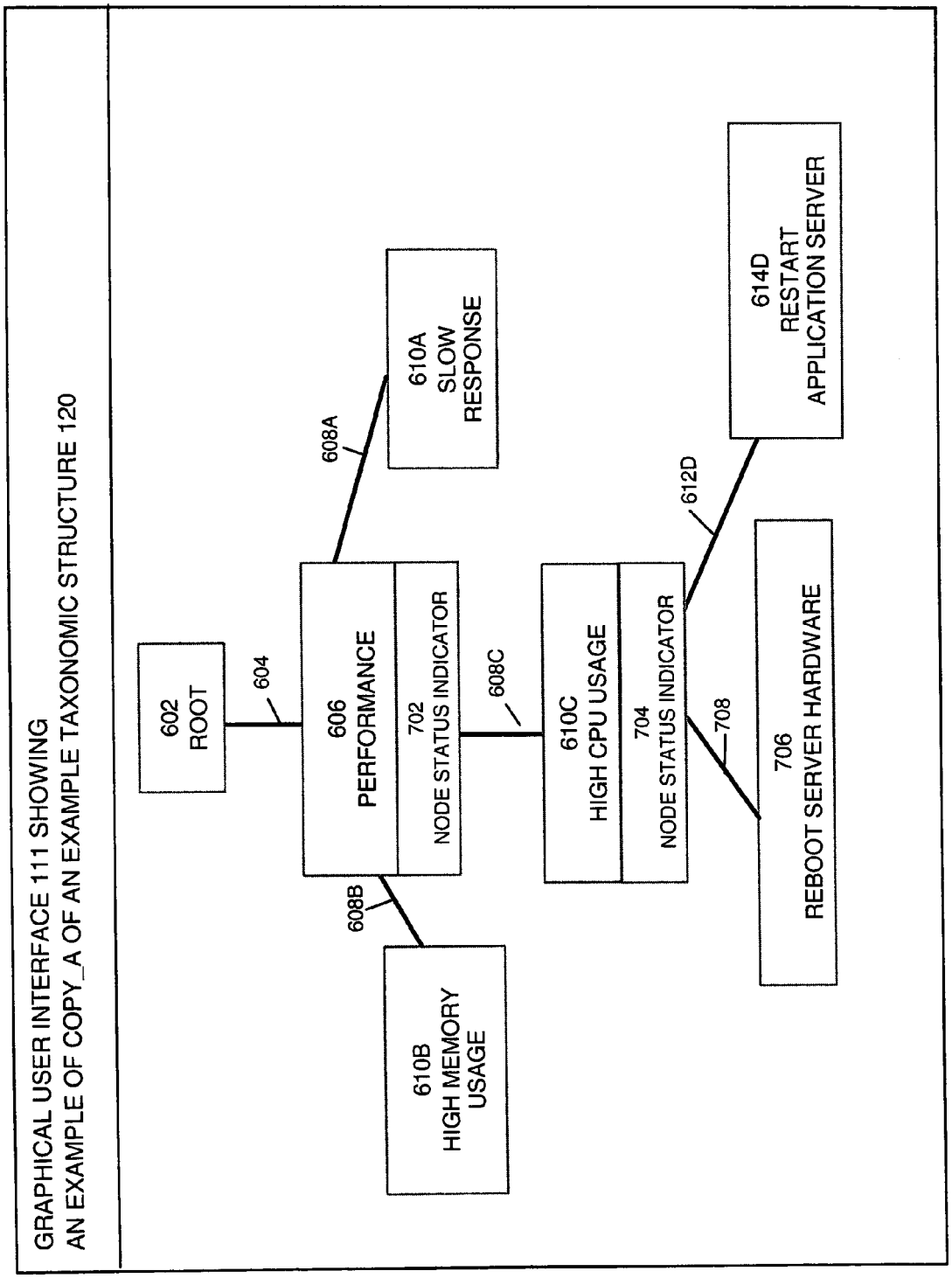
FIG. 7 shows the portion of the example copy of the MTS of FIG. 6.

FIG. 7 shows graphical user interface 111 showing an example of the copy of the taxonomic structure 120 of FIG. 6. In this taxonomic structure, the high level nodes associated with nodes 610B and 610A have been collapsed (on command initiated by the service analyst) because the service analyst feels that these nodes may not lead to solutions that could resolve the customer's problem. The service analyst had kept the copy of this taxonomic structure in case the customer calls back within 48 hours, for example. The service analyst may bring this taxonomic structure back up (from memory 104) because it was customized for a particular problem that the analyst is dealing with and that the analyst is not really sure if the problem was resolved satisfactorily. The customer happens to call back 10 hours later and tells the service analyst that restarting the application server did not fix or resolve the current problem. The service analyst requests the PIASIS 100 to bring this copy of the taxonomic structure back on to the graphical user interface 111. Upon inspection, the analyst may note that there are indicators associated with nodes 606, 610C and 614D which indicate the path the analyst took in the past to arrive at a potential solution. The indicators, which may be colors, that indicates the path that was traversed in the copy of the taxonomic structure. The service analyst looks at this problem and decides that solution node 614D was not a relevant the customer's problem. Now the service analyst may ponder another solution that may help but he still feels that the problem relates to a high CPU usage issue (node 610C). The service analyst perhaps uses his intuitive skills to trouble shoot or confers with his colleagues as to what other possible problems might be associated with a high CPU usage that might resolve the problem. The service analyst may deduce that perhaps the customer might try rebooting the server hardware. Then the analyst may instruct the PIASIS 100 to insert a new solution node 706 and then relate that new node to the problem/symptom node 610C via a new relationship line 708. So the PIASIS 100, responsive to the analyst's command, has created the new solution node 706 and the new relationship line 708 which relates the node 610C to the node 706. The service analyst recommends to the customer to reboot his server hardware. Perhaps this time around the service analyst decides to hang on to the telephone line to keep the line of communication open to the customer while the customer does as suggested. The customer may try rebooting his server hardware. Perhaps five or ten minutes later the customer comes back and indicates his satisfaction that indeed this was the appropriate solution or action that resolved his high CPU usage problem. The call between the service analyst and the customer may now end.

Now the service analyst feels that he has a new solution to add to the MTS 120. The service analyst then decides to de-indicate that solution node 614D solved the problem and then set a status indicator for the solution node 706 to indicate that that node was the appropriate action to take.

Figure 8:
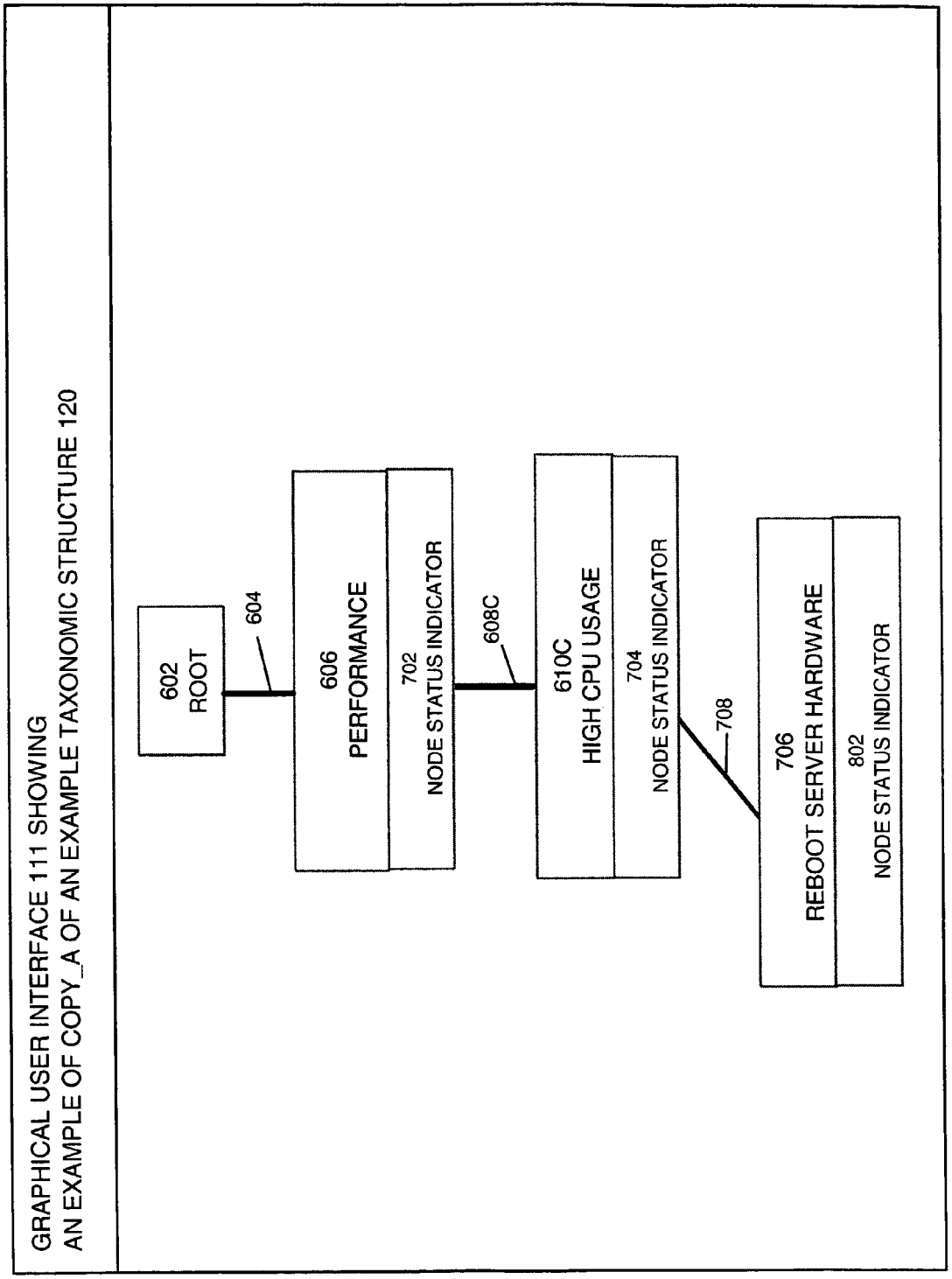
FIG. 8 shows another portion of the example copy of the MTS of FIG. 7.

FIG. 8 shows graphical user interface 111 showing the taxonomic structure of FIG. 7. The taxonomic structure shown in FIG. 8 shows a path taken by the analyst from the root node 602 to the solution node 706. This path actually resolved the customer's current problem. The service analyst uses the node status indicator of each of the higher level nodes 606, 610c and 706 to indicate that these nodes were the nodes that were traversed by the service analyst in order to solve the problem. Once the service analyst is satisfied that this indeed was the proper branch and node path, the service analyst may ask the PIASIS 100 to upload this information to the MTS 120 of FIG. 1. When an upload of a copy of a taxonomic structure is made back to a master taxonomic structure, the frequency of usage indicators are updated for each node along this indicated path so that the next time around, perhaps a week later, another customer might call about another problem with the product. And perhaps the node 606 might be promoted to a higher order: perhaps the node 606 might end up being the most likely node that another service analyst may traverse or investigate because the frequency of usage indicator has gone up for the node 606 in relation to the other first level nodes. The same may be said for the nodes 610C and the nodes 706 (higher level nodes).

Figure 9A:
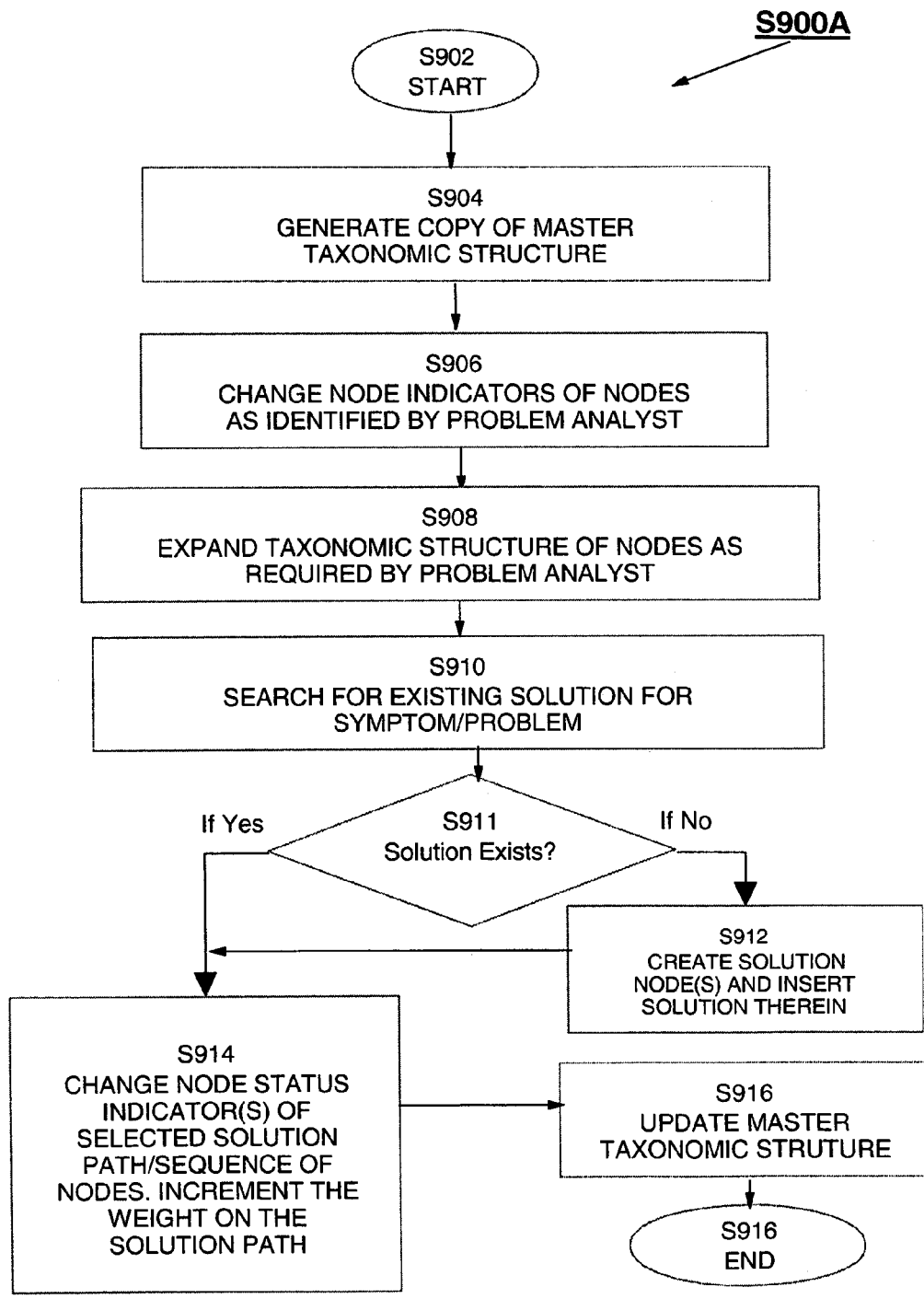
FIGS. 9A and 9B show operations S900A and S900B respectively of the data processing system of FIG. 1.

FIG. 9A shows a preferred operation S900A of the data processing system 102 of FIG. 1. Operation S900A is a data processing system-implemented method for directing the DPS 102 of FIG. 1 to facilitate problem resolution.

Operation S902 includes starting the PIASIS 100.

Operation S904 includes generating a copy of a master taxonomic structure.

Operation S906 includes change node indicators of nodes as identified by a service analyst.

Operation S908 includes expanding taxonomic structures of nodes as required by a problem analyst.

Operation S911 includes determining whether a viable solution exists in the taxonomic structure. If the viable solution exists within the taxonomic structure, control may be transferred to operation S914. If the viable solution does not currently exist within the taxonomic structure, control may be transferred to operation S912.

Operation S912 includes creating solution nodes and inserting a new viable solution therein.

Operation S914 includes changing notice node status indicator of a selected solution node (for example, changing the usage indicator).

Operation S916 includes updating a master taxonomic structure with information contained in the copy taxonomic structure and the information includes the identified nodes that resolve the customer's problem.

Operation S916 ends operations of the PIASIS 100.

Figure 9B:
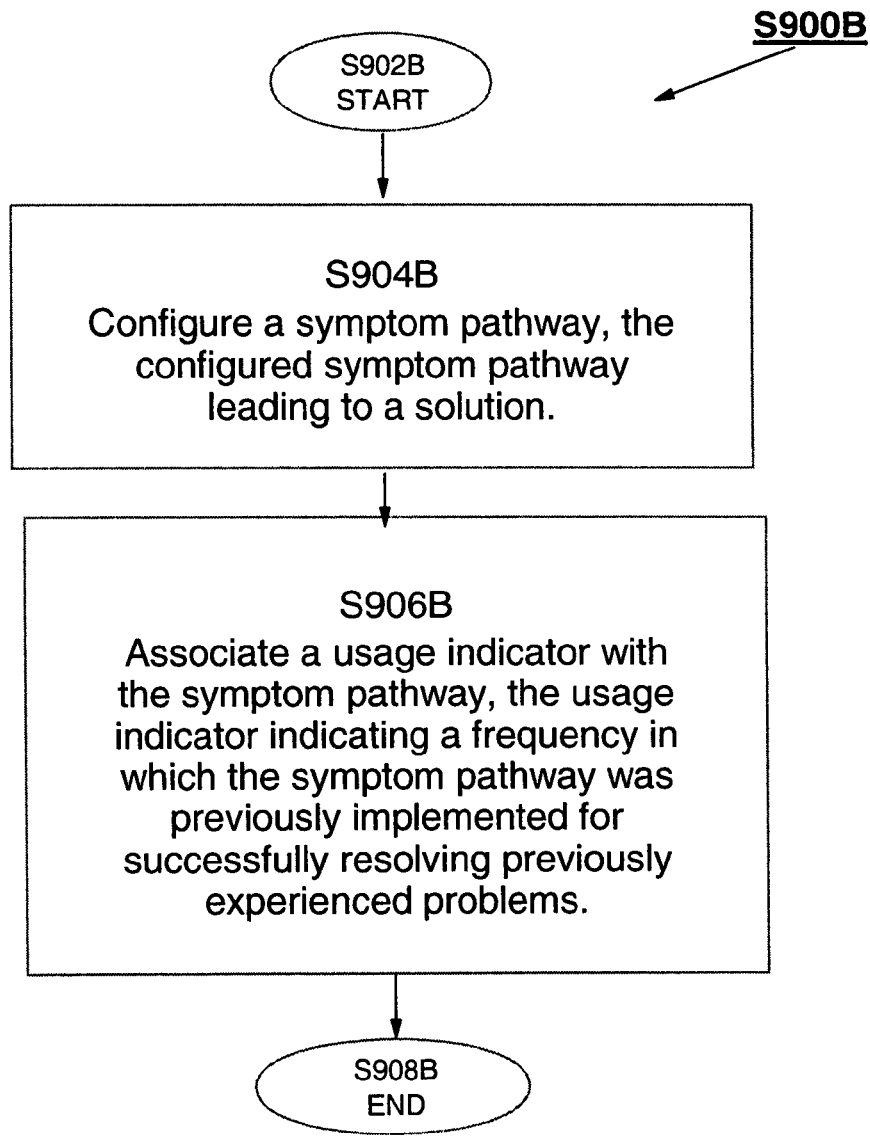

FIG. 9B shows operation S900B of the data processing system 102 of FIG. 1. Operation S900B is another example of a data processing system-implemented method for directing the DPS 102 of FIG. 1 to facilitate problem resolution.

Operation S902B begins the facilitation of problem resolution.

Operation S904B directs the DPS 102 to configure a symptom pathway, the configured symptom pathway leading to a solution.

Operation S906B directs the DPS 102 to associate a usage indicator with the symptom pathway, the usage indicator indicating a frequency in which the symptom pathway was previously implemented for successfully resolving previously experienced problems.

Operation S908B stops the DPS 102.

Figure 10A:
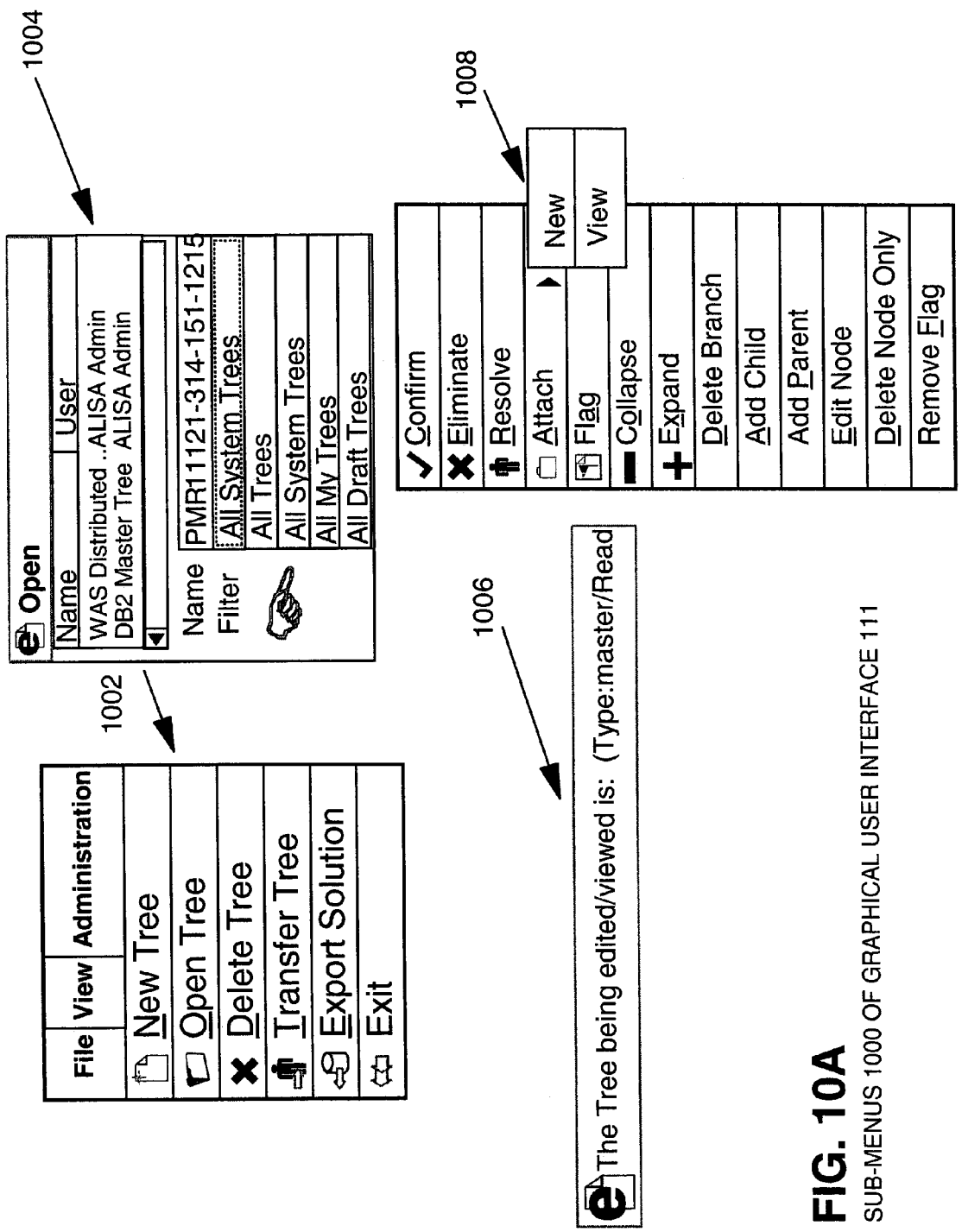
FIGS. 10A, 10B show sub-menus included in a graphical user interface generated by the data processing system of FIG. 1.
Figure 10B:
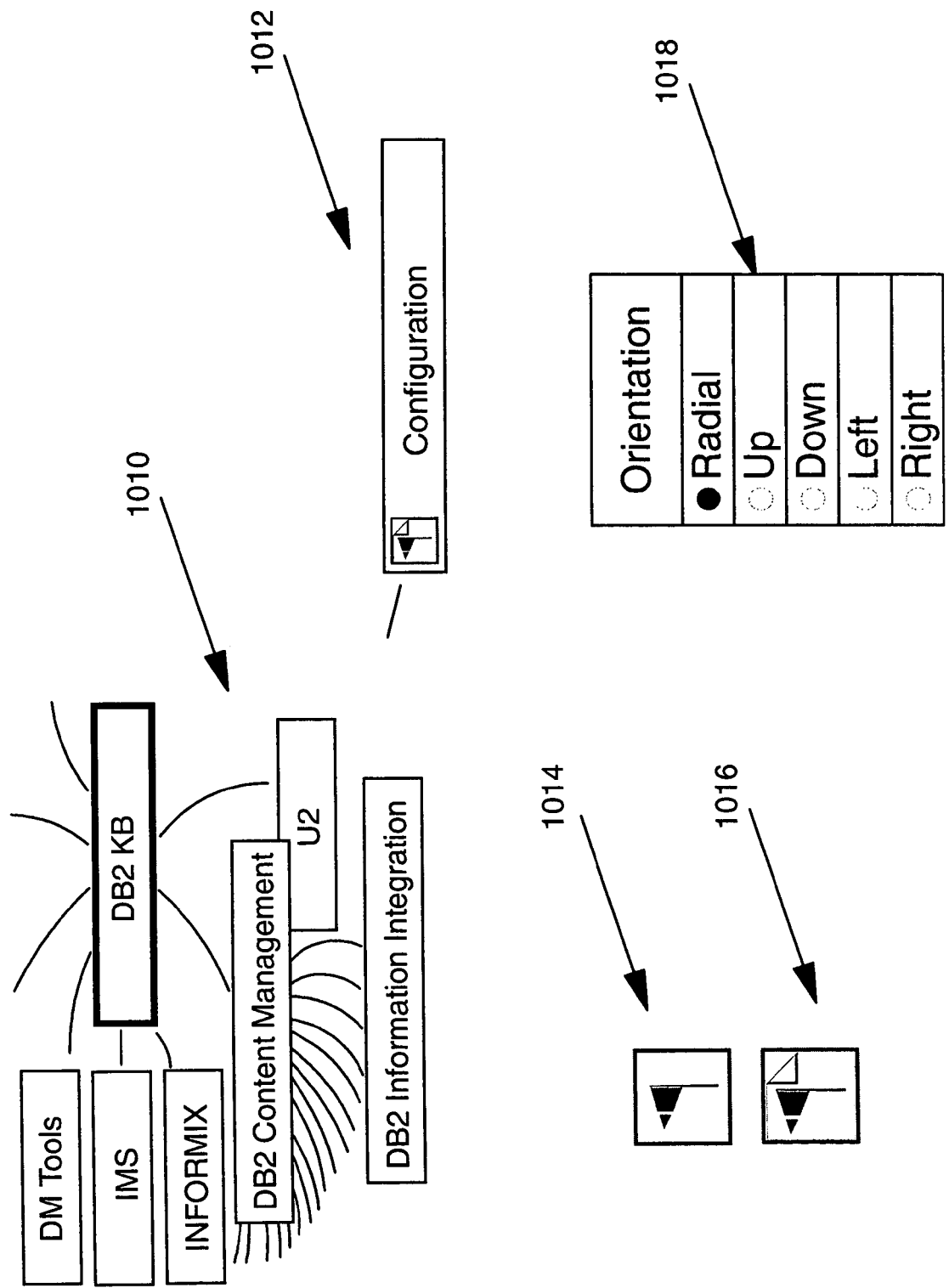

FIGS. 10A and 10B show example sub-menus included in the GUI 111 generated by the PIASIS 100 of FIG. 1. The GUI 111 provides a dynamic visualization interface that may allow navigating the MTS 120 when investigating customer problems, building a new problem solving path associated with a PMR (a copy of the MTS 120), managing of open PMRs (ongoing and unresolved problems), storing notes and documentation (for selected nodes and/or relationship lines), collaborating on cross-brand solutions, and transferring the PMR to another analyst.

The GUI 111 may display a decision tree having branches, leafs, nodes, parent, grandparent, child (i.e., sibling), grandchild and sibling hierarchy. Each branch may consist of nodes for the decision points and troubleshooting steps or symptom identification or potential solutions. A final node in a string of nodes indicates a confirmed potential solution (a solution which worked in the past for another customer problem). The entire tree structure may be accessible, but branches may be collapsed and expanded as required by the analyst (such as by dragging a selected node to the center of the screen for example).

The GUI 111 permits a way for analysts to construct branches that represent selected PMRs, with each node as a step in the investigation, uploading solutions to the MTS 120, managing private investigations of several PMRs concurrently, attaching documentation and URLs that relate to the problem (perhaps attaching these notes to specific nodes or relationships lines), using the search and navigation features to troubleshoot a new problem.

The following description discusses example excerpts from hypothetical users manual for the PIASIS 100.

Opening a New PMR Branch

Log in using your Intranet password.

From sub menu 1002, select the File Menu Option File/Open Tree to permit user access to all trees (that is, all MTSs) that the user may be entitled to view.

Upon being prompted by sub-menu 1002 for a PMR number, and the user may then enter the PMR number here and start a new branch in the draft investigation mode.

Using the sub-menu 1004 (the filter dropdown list), the user may restrict the list to his MTSs only, or to return to view the MTS 120. The user may view, but cannot alter, branches owned by others.

The user may now navigate the product and component shown in the MTS 120.

The user may click on the nodes to bring them to the center of the screen. The root node is always visible. The entire MTS 120 may remain accessible to the user.

User Process for Building a Branch of the MTS 120

Add new nodes (by right clicking the mouse and select Add Child: see sub menu 1008) for each step in the investigation.

Add a node title and description. Add any documentation or links as attachments as needed. Click View/Node Panel if the information panel is hidden.

Use the Attachments tab to switch to the URL and file attachment panel. Add a code sample or memory dump as a text attachment, and include URL links to text documents, manuals, or Technical notes.

To go back and add more information to a previous node, highlight the node, right click, and select Edit Node. Make changes in the dialog box. The node panel itself may not be edited by the user.

Switching from Draft Investigation Mode to the MTS 120

When a user opens a copy of the MTS 120, the user is placed in the draft mode. This is the user's working view of the MTS 120, until the user clicks Resolve at which time this action by the user will promote the PMR branch to the MTS 120. The user performs this action only after the user confirms that all the steps and all relevant documentation is added.

To return to the MTS 120, at any time, the user clicks File/Open Tree (see submenu 1002), then the user changes the Filter to All System Trees as shown in sub menu 1004 (see the File/Open Tree Pop-up Menu). The user highlights the MTS that they may want to view, and then clicks Open.

If the user selects All My Trees, the user may be taken back to the list of the user's trees (that is, taxonomic structures) or may be taken back to the user's PMRs. It is understood that users (that is, the service analyst) may insert trees, branches of trees independently of a PMR.

The status bar at the bottom left of the GUI window may indicate which MTS and view the user happens to currently be in (see menu 1006).

Any actions that the user takes in the user's draft view are automatically saved. The MTS will reopen exactly as the user left it next time the user logs in.

The user may maintain multiple branches concurrently for each problem that the user was working on (but had not resolved or merged with the MTS 120).

To log out, the user uses File/Exit rather than closing the GUI window, for proper database disconnection.

Sub menu 1008 shows the Right Click Menu Bar Options. Some will be grayed out, depending on permissions and task.

Promoting Confirmed Solutions

As the user proceeds down a branch, the user confirms successful steps (by Right Clicking/Confirm). The nodes will change to green and visually indicate where the user is currently positioned in the MTS.

When the user reaches the final node or leaf, and the customer (that is, the user who called in with the problem) confirms that the problem has been resolved, it is time for the user to promote the solution to the MTS 120. This may be done by Right clicking/Resolve.

The user may Rich Click/Eliminate any possibilities (other nodes) that have been tried that do not resolve the problem at hand. These other nodes will turn red, but will not be deleted. If the user transfers the problem to other analysts, they may be able to see what alternatives the user has tried and eliminated. When the user promotes a new branch, however, only green steps will be uploaded to the MTS 120.

As the Knowledge base becomes populated, the user may use the Search function to quickly locate a particular node in the MTS based on keywords and phrases contained in the title and description.

The user may browse the current solutions before opening a new PMR or viewing a tree. If an existing solution matches the current problem, the user may Right click/Export to copy the steps (the steps from the root node or from the current node, or other portion of a symptom pathway in general) to an e-mail for the customer to follow. This provides easy reuse of solutions.

Problem Investigation: Exploring an MTS

In the MTS 120, the Start or Root node in sub-menu 1010 of FIG. 10B may be color coded, such as the Root may be burgundy colored for example. The surrounding high-level nodes have arrows in the lower right corner to indicate collapsed branches. The user may explore the branches by clicking on the nodes. A taxonomy of nodes are nodes which are classified in an ordered system or categories that indicates natural relationships. The user may drag a node to the center of the GUI screen to zoom in or focus on a particular part of the MTS.

To troubleshoot a problem, the user first looks for the most frequently used solutions. For example, the green gauge level indicates how often a path has been successfully reused (see submenu item 1012).

A user may add information or comments to an existing branch by flagging a node (by Right clicking/Flag from the menu). The user's comments will be e-mailed to the node owner, and may appear in the Flag Info tab in the node panel (see submenu item 1014). Since the PIASIS 100 is a collaboration tool, so the user's comments will help build the knowledge base.

A node that contains both attachments and flags may have the indicator shown as sub menu item 1016.

A user may alter the orientation of the MTS according to the preferences available in sub menu 1018.

The user may use the Search icon (binoculars) to locate keywords and phrases.

Example Menu for Transferring a PMR to Another Analyst User

Go to File/Transfer Tree.

Browse the list of MTSs and the list of authors.

The new author will receive an e-mail notification.

The transferred PMR will open as the default when the recipient next enters.

Example Text Based Output Sent to a User Experiencing a Product Problem

Tech Note Contents:

Step 1:
  Short Description: WebSphere Application Server
  Long Description: None
  URL: None Step 2:
  Short Description: V5.0x
  Long Description: None
  URL: None Step 3:
  Short Description: EJB Container
  Long Description: None
  URL: None Step 4:
  Short Description: MDB
  Long Description: None
  URL: None Step 5:
  Short Description: Check systemout.log for error messages
  Long Description: None
  URL: None Step 6:
  Short Description: MQJMS1025
  Long Description: The MQJMS1025 message appears in the systemout.log
  URL: None Step 7:
  Short Description: WMSG0018E
  Long Description: Error on JMSConnection for MDB RequestDispatcherBean. This message follows immediately after the MQJMS1025 message in the systemout.log.
  URL: None Step 8:
  Short Description: Was the queue manager down?
  Long Description: During the time of the exception, the MQ Series Queue manager was down for a period of 4 minutes or longer
  URL: None Action:
  Short Description: Set max.recovery.retries and max.retry.interval on Listener service
  Long Description: Go to the application Server the MDB is running under, and edit the Listener service the MDB is configured to use. Add the following values under 'Custom properties': max.recovery.retries and max.retry.interval. If they are not set, they will default to 5 retries and an interval of 60 seconds. This means that if the Queue manager is down for longer than 4 minutes, the MDB's Listener service will not be able to reconnect. These properties can be set to any value between 0 and 2147483647.
  URL: None (End of Example)

The detailed description of the embodiments does not limit the implementation of the embodiments to any particular computer programming language. The computer program product includes executable computer code complied from computer programmed instructions which may be implemented in any computer programming language provided that the OS (Operating System) installed in the data processing system provides the facilities that may support the requirements of the computer program product. A preferred embodiment is implemented in the Java computer programming language (or may be implemented in other computer programming languages in conjunction with Java. Any limitations presented would be a result of a particular type of operating system, computer programming language, or data processing system and would not be a limitation of the embodiments described herein.

It will be appreciated that the elements described above may be adapted for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A method for troubleshooting computer system problems using a master taxonomic structure which classifies the computer system problems, the master taxonomic structure comprising a plurality of symptom pathways, the method comprising:
  opening a session for resolving a computer system problem;
  generating a copy of the master taxonomic structure;
  displaying symptom pathways included in the generated copy of the master taxonomic structure, each of the symptom pathways being associated with a displayed usage indicator indicating a frequency in which the respective symptom pathway was previously implemented for successfully resolving the computer system problem, and enabling a user to select one of the displayed symptom pathways based on the respectively displayed usage indicators associated with each of the plurality of the symptom pathways and a symptom associated with the computer system problem;

displaying the selected symptom pathway, wherein the displayed, selected symptom pathway includes nodes and connectors, each node indicating a symptom or solution related to the computer system problem, each node being interconnected to a neighboring node by a connector, wherein node usage indicators are displayed in association with each respective node of the displayed, selected symptom pathway, each of the node usage indicators indicating frequency of the respective node's usage to solve the computer system problem relative to other nodes of the displayed, selected symptom pathway, traversing at least a first portion of the displayed, selected symptom pathway responsive to further user selection to resolve the computer system problem, the further user selection being informed by the displayed node usage indicators associated with each respective node;

adding, to each node included in the first portion, a node history indicator indicating that the respective node is included in the first portion;

updating the displayed, selected symptom pathway by updating the node usage indicators of the nodes included in the first portion responsive to receiving an update request from the user; and updating the master taxonomic structure responsive to receiving user indication that the computer system problem is resolved, including updating node usage indicators and node history indicators of nodes included in a portion of a symptom pathway in the master taxonomic structure corresponding to the first portion of the updated symptom pathway, wherein the node usage indicators and the node history indicators of the nodes included in the portion of the symptom pathway in the master taxonomic structure are updated based on the updated node usage indicators and the added node history indicators, respectively, of the nodes included in the first portion.

2. The method according to claim 1, further comprising:

after updating the displayed, selected symptom pathway, enabling the user to select between i) saving the copy of the master taxonomic structure, including the updated symptom pathway, for a predetermined time, wherein the copy includes the added node history indicators and the updated node usage indicators, and ii) closing the session; and if the user selects to save the copy and an indication is then received from the user within the predetermined time that the computer system problem was not resolved by traversing the first portion of the previously displayed symptom pathway, displaying the saved copy of the master taxonomic structure, including the added node history indicators and the updated node usage indicators, such tat the computer system problem is resolved by traversing at least a second portion of the displayed symptom pathway that includes at least one node not included in the first portion, based on the displayed node history indicators associated with nodes included in the first portion.

3. The method according to claim 2, wherein the displaying the selected symptom pathway further comprises displaying node status indicators associated with each node of the displayed, selected symptom pathway, wherein a color of each node stabs indicator indicates a status of each respective node as a newly added node, an unused node, an unconfirmed solution node, a confirmed solution node, or a node indicating a most likely solution to the computer system problem.

4. The method according to claim 3, wherein the traversing at least the first portion of the displayed, selected symptom pathway further comprises traversing at least the first portion of the displayed, selected symptom pathway based on the displayed node status indicators.

5. The method of claim 4, wherein the displayed, selected symptom pathway comprises:

a starting node representing a place to begin investigation of the computer system problem;

intermediate level nodes indicating at least one symptom related to the computer system problem; and a terminus node representing a potential solution resolving the at least one symptom indicated in the intermediate level nodes, wherein said connectors interconnect the starting node, the intermediate level nodes and the terminus node.

* * * * *